(12) United States Patent
Rana et al.

(10) Patent No.: US 11,232,594 B1
(45) Date of Patent: Jan. 25, 2022

(54) ITERATIVE POINT INDEXING

(71) Applicant: Tobii AB, Danderyd (SE)

(72) Inventors: Pravin Kumar Rana, Danderyd (SE); Macarena Garcia Romero, Danderyd (SE); Yimu Wang, Danderyd (SE); Rickard Lundahl, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/078,834

(22) Filed: Oct. 23, 2020

(51) Int. Cl.
| | |
|---|---|
| *H04N 9/47* | (2006.01) |
| *G06T 7/80* | (2017.01) |
| *H04N 17/00* | (2006.01) |
| *G06T 7/70* | (2017.01) |
| *G06F 16/51* | (2019.01) |
| *G06F 3/01* | (2006.01) |

(52) U.S. Cl.
CPC ............... *G06T 7/80* (2017.01); *G06F 3/013* (2013.01); *G06F 16/51* (2019.01); *G06T 7/70* (2017.01); *H04N 17/002* (2013.01); *G06T 2207/30204* (2013.01)

(58) Field of Classification Search
CPC .......... H04N 7/00; H04N 17/002; H04N 7/18; H04N 9/47; G06T 7/80; G06T 7/70; G06T 2207/30204; G06F 16/51; G06F 3/013
USPC .................................... 348/78, 115; 345/156
See application file for complete search history.

(56) References Cited

U.S. PATENT DOCUMENTS

| | | | | |
|---|---|---|---|---|
| 6,943,754 | B2* | 9/2005 | Aughey | A61B 3/113 |
| | | | | 345/7 |
| 7,963,652 | B2* | 6/2011 | Vertegaal | G06T 7/251 |
| | | | | 351/205 |
| 9,147,248 | B2* | 9/2015 | Kaplan | G06F 3/013 |
| 9,530,225 | B1* | 12/2016 | Nieves | G06T 9/001 |
| 9,807,383 | B2* | 10/2017 | Crispin | H04N 17/004 |
| 10,445,860 | B2* | 10/2019 | Fix | G09G 5/00 |
| 10,467,470 | B2* | 11/2019 | Gustafsson | G09G 5/34 |
| 10,719,125 | B2* | 7/2020 | Steedly | A63F 13/22 |
| 10,719,953 | B1* | 7/2020 | Ye | G06T 7/73 |

* cited by examiner

*Primary Examiner* — Trang U Tran
(74) *Attorney, Agent, or Firm* — Samuel I. Yamron (57) ABSTRACT

The invention is related to a method for calibrating an eye tracking device within a head-mounted display (HMD) comprising the steps of acquiring with the HMD via an image sensor, at least one optical target image from an optical target, wherein the optical target contains image points in a pattern, indexing image points within the optical target image wherein the image points are indexed by, selecting a rigid region of the optical target image, assigning indices to image points within the rigid region, fitting a polynomial approximation function to at least one column and one row of the image points of the region, predicting the location of at least one image point using the fitted polynomial approximation function, assigning the predicted image point an index, inputting indexed image points into an optimization algorithm that calculates a hardware calibration of the HMD, and writing hardware calibration values calculated from the optimization algorithm to the HMD unit.

17 Claims, 9 Drawing Sheets

ITERATIVE POINT INDEXING

TECHNICAL FIELD

The present application relates to gaze detection systems and methods. Such systems and methods may be embodied within virtual reality devices, augmented reality devices, and/or other computing devices and support user interactions with such computing devices using gaze information. In particular, the present disclosure relates to systems and methods of hardware calibration based on distortion compensation.

BACKGROUND

Devices containing integrated eye tracking platforms containing integrated optics require factory hardware calibration. The calibration of the eye tracking platform defines the absolute relationship between real-world coordinates and image coordinates, to account for optical and processing distortions. Generally, a lens in a wearable device, suffers from pincushion distortion. This distortion strongly affects the eye image capture directly and affects the gaze tracking performance indirectly. Technically, due to the lens pincushion distortion, the captured eye image can have a lot distortion especially when the eye moves far away from the lens (relative to a threshold value). Accurate and reliable calibration systems are thus required for the eye tracking platform to perform their functions properly and without unacceptable error. Description of the need for distortion modeling for eye tracking hardware calibration has been previously described in U.S. patent application Ser. No. 16/970,549, filed Aug. 17, 2020 (hereby incorporated by reference).

SUMMARY

Hardware calibration is performed with the use of a calibration rig that displays an optical target image to the eye tracking platform and the optical target image is at a set distance from the eye tracking platform. Images are then acquired by the eye tracking platform wherein the images are processed by detecting dots within the image and those detected dots are indexed. The indexed features are then inputted into an optimization algorithm that calculates the hardware calibration of the eye tracking platform and the outputted calibration values are written to the hardware unit. Thus, the hardware calibration method determines a level and/or a pattern of distortion in the image based on the image data. The computer system may apply a pattern recognition or an image analysis algorithm to recognize the level and pattern. Alternatively, the system may match the image data to one of the known images available from the predictive model, the local memory, or the remote memory. For instance, a best match is identified, and the matched known image is used. That known image is associated with the level and pattern of the distortion in the predictive model. Improvements to the dot detection and indexation steps are discussed herein.

According to a first aspect of the invention, a there is provided a method for calibrating an eye tracking device within a head-mounted display (HMD) comprising the steps of acquiring with the HMD via an image sensor, at least one optical target image from an optical target, wherein the optical target contains image points in a pattern, indexing image points within the optical target image, inputting indexed image points into an optimization algorithm that calculates a hardware calibration of the HMD, and writing hardware calibration values calculated from the optimization algorithm to the HMD unit.

According to a second aspect of the invention, a there is provided a method for calibrating an eye tracking device, wherein the image points are indexed by selecting a rigid region of the optical target image; assigning indices to image points within the rigid region, fitting a polynomial approximation function to at least one column and one row of the image points of the region, predicting the location of at least one image point using the fitted polynomial approximation function, and assigning the predicted image point an index.

According to a third aspect of the invention, there is a provided a head-mounted display (HMD) device comprising, an eye tracking device having, an image sensor, and one or more processors configured to at least acquire with the image sensor, at least one optical target image from an optical target, wherein the optical target contains image points in a pattern, index image points within the optical target image, input indexed image points into an optimization algorithm that calculates a hardware calibration of the HMD unit, and writing hardware calibration values calculated from the optimization algorithm to the HMD unit.

According to a fourth aspect of the invention, there is a head mounted display (HMD) device of wherein the image points are indexed by selecting a rigid region of the optical target image, assigning indices to image points within the rigid region, fitting a polynomial approximation function to at least one column and one row of the image points of the region, predicting the location of at least one image point using the fitted polynomial approximation function, and assigning the predicted image point an index.

BRIEF DESCRIPTION OF DRAWINGS

Specific embodiments will now be described in detail with reference to the accompanying drawings, in which.

DETAILED DESCRIPTION

Figure 1:
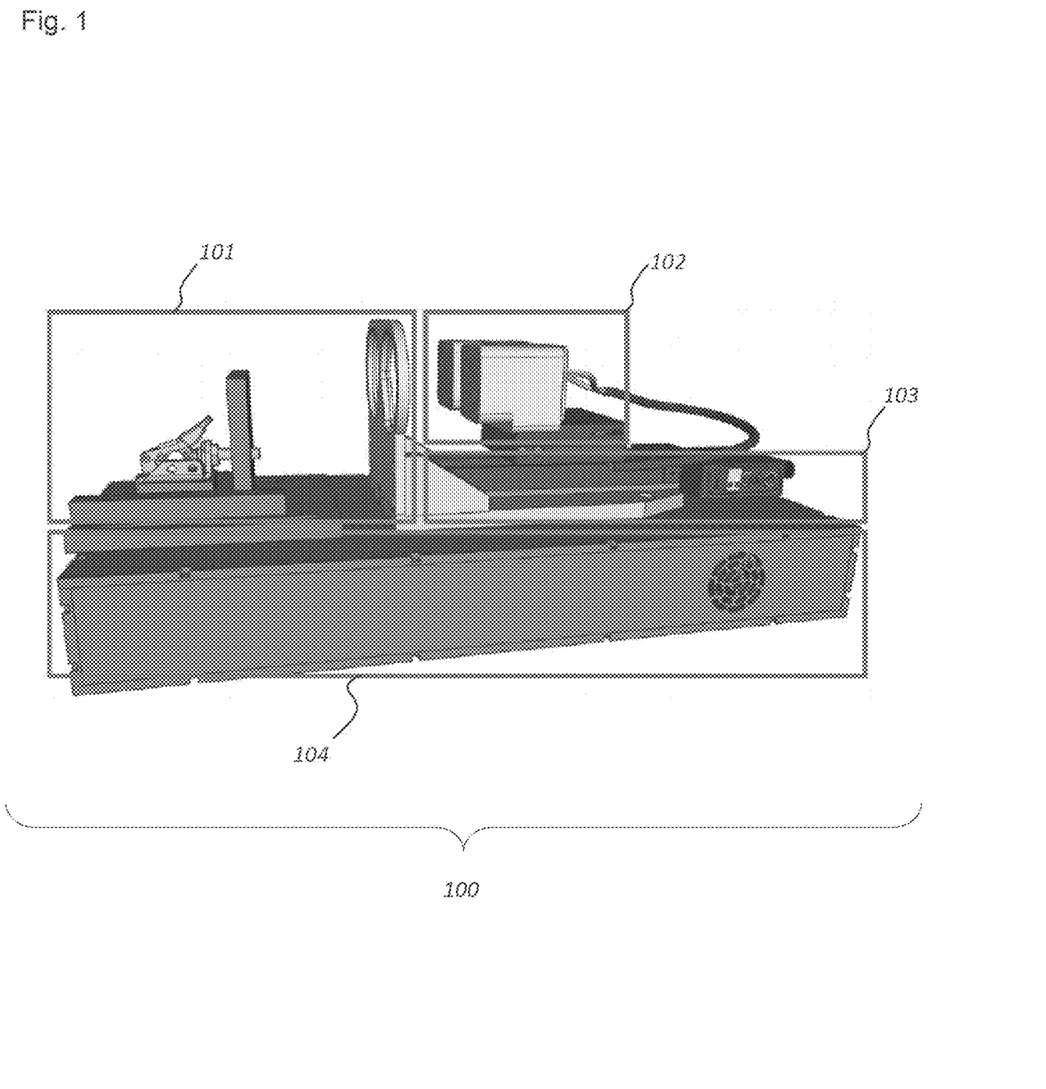
FIG. 1 shows a hardware calibration rig for an eye tracking optical system in a virtual reality (VR) headset.

FIG. 1 depicts a hardware calibration rig 100 for an eye tracking optical system. The embodiment of FIG. 1 displays a calibration rig for a virtual reality (VR) head mounted display (HMD). The calibration rig 100 consists of a mounting block 101, optical target block 102, movement block 103 and control block 104. During calibration of an HMD containing an eye tracking platform rigidly mounted to the control block 104 using the movement block 101. The optical target that is mounted to the optimal target block 102 is set a first distance using the movement block 103. In one embodiment the first distance may be 7 mm from the lens surface of the HMD and the optical target may be moved in steps of 1 mm away from the lens surface of the HMD. At each distance optical target images are acquired.

Figure 2:
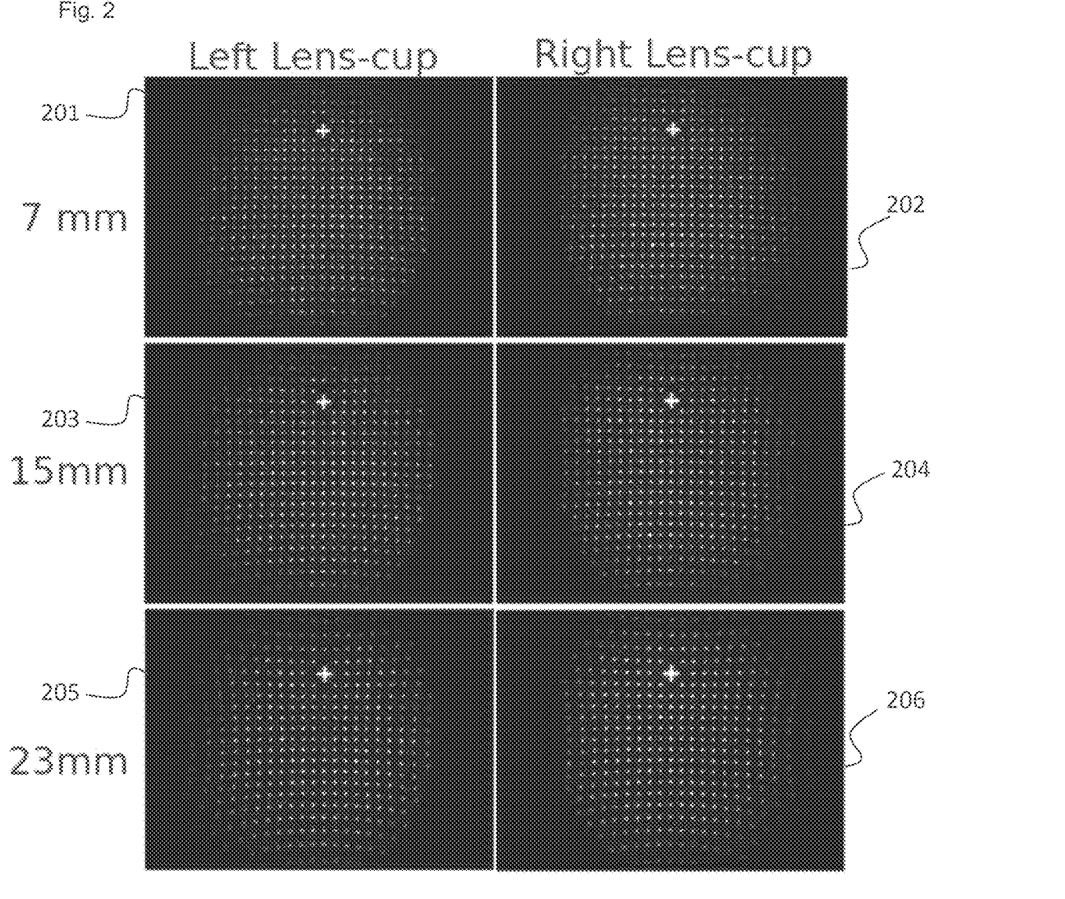
FIG. 2 shows an example of optical target images at three different distance from a left and right lens-cup.

FIG. 2 depicts an example of optical target images at three different distance from a left and right lens-cup of the HMD.

In the embodiment shown in FIG. 2, the distances set are 7 mm, 15 mm, and 23 mm and the respective captured images from the HMD are shown 201-206. As seen in the captured images of FIG. 2 the captured images consist of cross and dot features. The cross and dots are created by the optical target, wherein the dots from a grid and the cross serves as a reference for use between the images captured at different distances.

For each captured image, point detection and indexation is performed as a part of the calibration process. The point detection and indexing may consist of detecting the dots and using the cross as a reference between the various images. The indexed features from each image are then inputted into an optimization algorithm that calculates the hardware calibration. The optimization algorithm may also detect artifacts and misalignments in the general HMD optical design and specially for the eye tracking optical design and may suggest correction. The hardware calibration is then written to the HMD unit.

Figure 3:
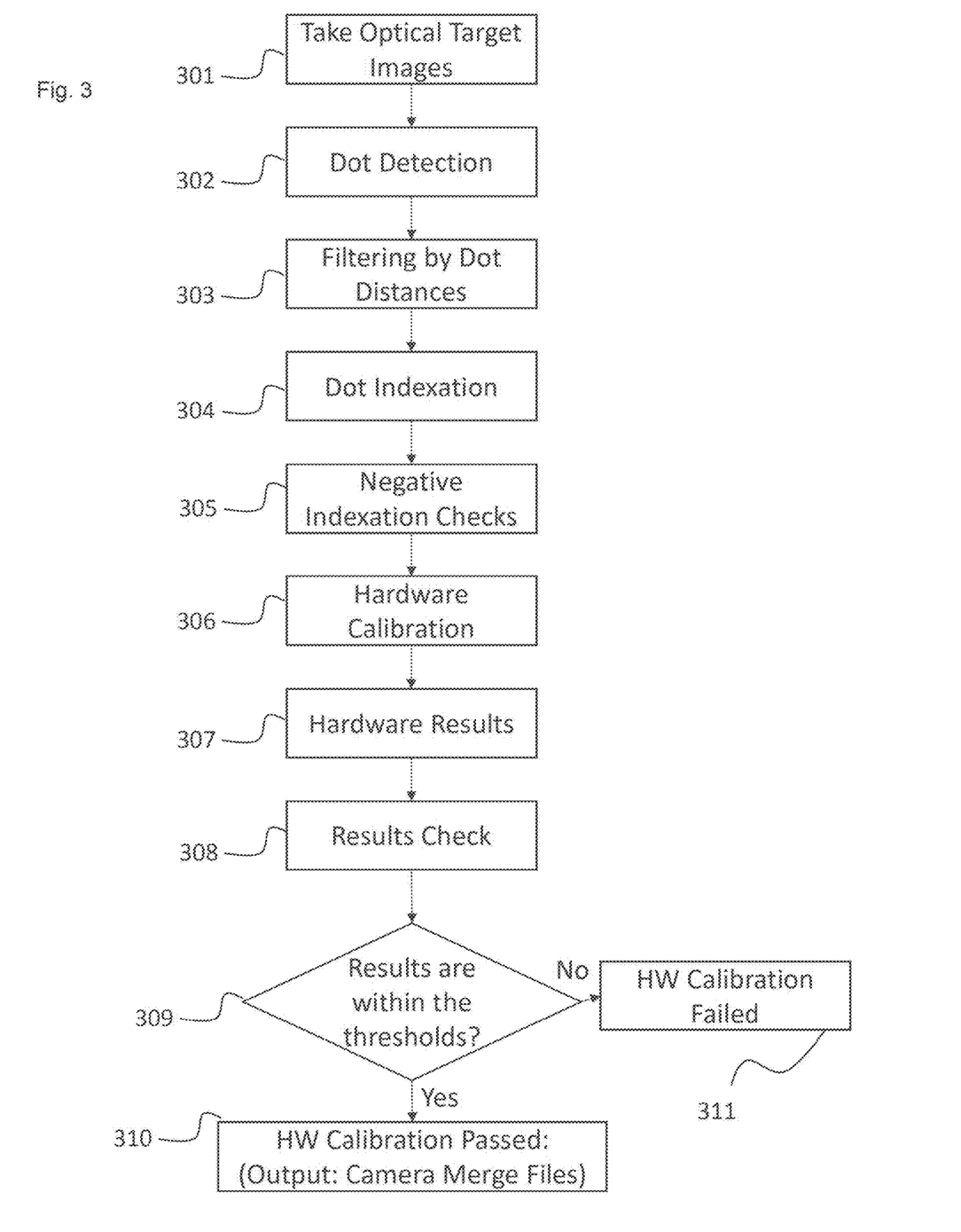
FIG. 3 shows a flow chart of one embodiment of the hardware calibration process.

FIG. 3 is a flow chart depicting one embodiment of the hardware calibration process. At step 301, captured images of the optical target are acquired by the HMD. At step 302 the calibration process detects the dots within each captured image. At step 303 the dot locations are filtered by distance and at step 304 the dots are indexed such that they can be made to correspond to the detected dots from the other captured images as well as the real world optical target image. At step 305 the algorithm performs a negative index check and at step 306 the algorithm uses the dot indexation to create the hardware calibration results 307. Additional input parameters in the hardware calibration algorithm may include layout of the optical target, number of dots and cross index and other optical target definition values.

At step 308 the results of the hardware calibration are checked against preset target thresholds 309. If the calibration does not meet the thresholds 311 the calibration fails and further calibration will be required. If the calibration meets the target thresholds then the determined calibration values are written to the HMD 310.

Returning now to dot detection 302 and indexation 304, these are the critical steps that provide the information necessary in having the exact optical target layout and distance to the eye tracking platform as a reference for the calibration algorithm. During the dot detection 302 and indexation 304 process, cross and dot positions in the images as well as their correspond positions in the real world are the input to the optimization algorithm that calibrates the optical system. To know which dot is which and be able to do the image-world correspondence, the dots must be assigned indices. Distortion of the captured image is introduced by the HMD lens (typically Fresnel) in the eye tracking platform, which creates difficulty in accurately assigning the correct index to each dot. Describing the distortion of the lens is thus part of the hardware calibration process and must be accounted for when point indexing in the current scenario.

For images with significant distortion, a rigid (all points at the same separation) approach is not sufficient. A factored compensation for the distortion is required for accurate and reliable indexing. The proper definition of the distortion model requires that the point indexing is performed with a high degree of accuracy. This means that the distortion model is not available at the initial stage of the calibration process. Thus to compensate for the distortion, the process of indexing the points relies on the known general behavior of the distortion as a starting point, without requiring the knowing the specific distortion of the eye tracking platform being calibrated.

Figure 4A:
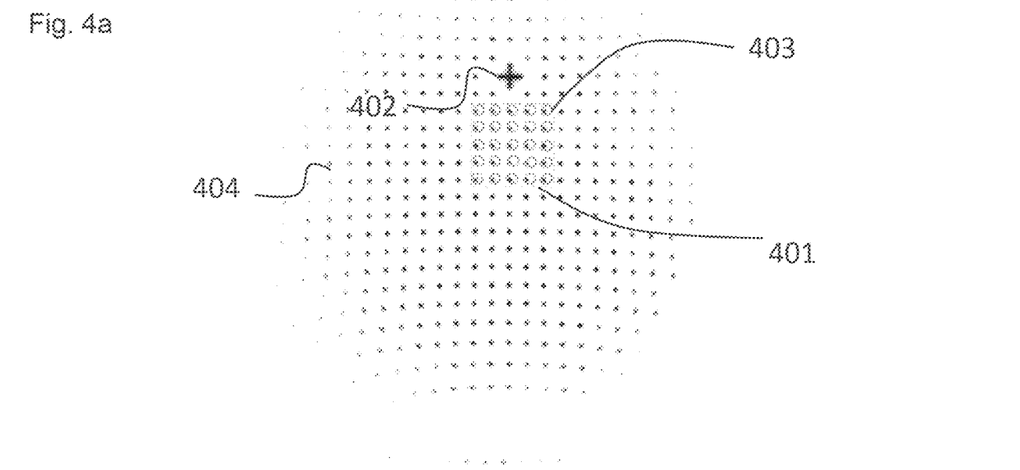
FIG. 4a-4o shows a step by step illustration of the iterative dot detection, polynomial fitting and non-linear indexing process.

The nonlinear indexing algorithm follows the following steps. A center point (cross) 402 is selected for the iterations. In one embodiment the central most point of the image is selected as the center point 402, however, it is contemplated that other points 404 could be selected as the center point for the iterations. The selected center point is then assigned the index of (0, 0).

A rigid model 401 initially used to fit the immediate neighboring points (n×n) with the center at the selected center point. In one embodiment a 5×5 point pattern is assumed to fit within the rigid model 401, however the immediate neighboring points (n×n) expected to fit the rigid model are understood to depend on the expected distortion of the center area and thus a different set of points could be selected for n×n. From this immediate neighboring point region, the median min distance is calculated using the rigid model. From the center point 402, the algorithm calculates the number of median min distances from the center point the x and y to each of the points in the defined rigid area and assigns the corresponding indices 403. In some embodiments an error margin is defied to compensate for deviation in the point positions and small distortions that might appear in the rigid region 402.

For each row and column of the detected pattern in the rigid region 402, a polynomial 405 is fitted to the point pattern and point spacing, and the polynomial 405 is then used to predict the location of the subsequent points 407 along the line of the selected column or row. Points 407 are then matched at the next radial distance level from the center and the process is repeated until either all points have been matched or a set maximum distance has been reached. During this repeated process, rows and columns are iterated in alteration.

In this embodiment, it is assumed that the point location can be approximated by a second degree polynomial and the inter point distance along the line as a third order polynomial. It is necessary that there are at least three points to fit the polynomial. If there are not enough rigid points selected to fit the desired polynomial degree, the algorithm repeats a second rigid indexing round at an increased radial distance from the center point. An error margin is defined to compensate for deviations in the point positions and deviations in the polynomial fitting.

To compensate for missed points, the iteration can be repeated from the start, this time knowing all previously indexed points. Swapping the order of row and column indexing provides better redundancy. A more permissive error margin can be used for repeated tries. In an alternative embodiment, adding an offset to the prediction can be used to help index points out of the polynomial scope, in high distortion cases. All indexed points are checked for consistency and the ones that do not fulfill the constraints are removed. All 2d indices are converted to 1d indices given the target definition.

Figure 4B:
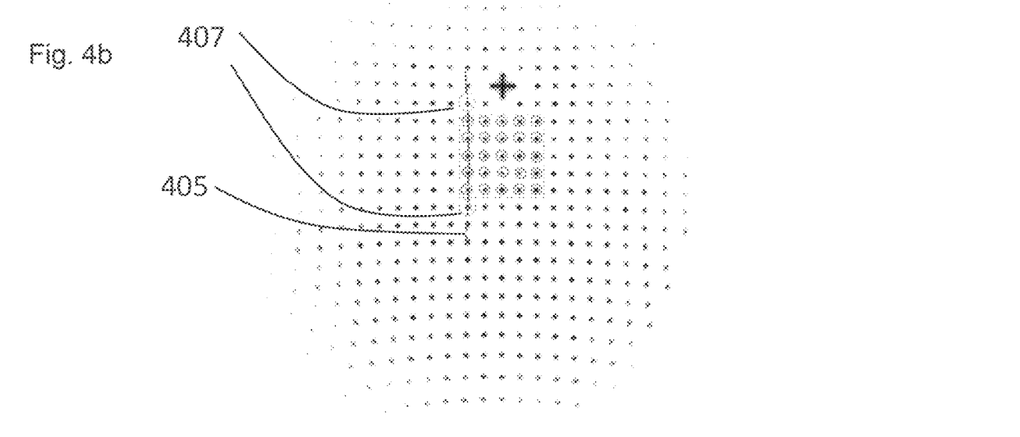
Figure 4C:
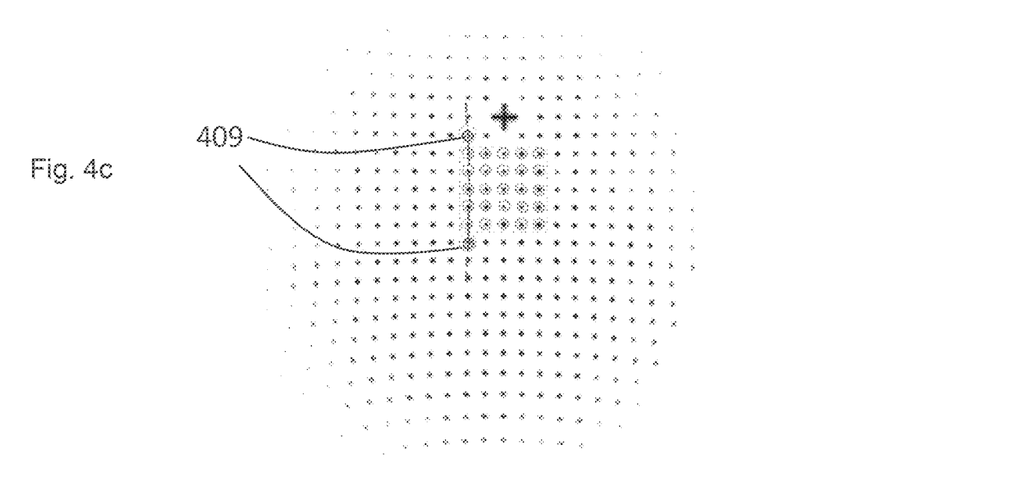
Figure 4D:
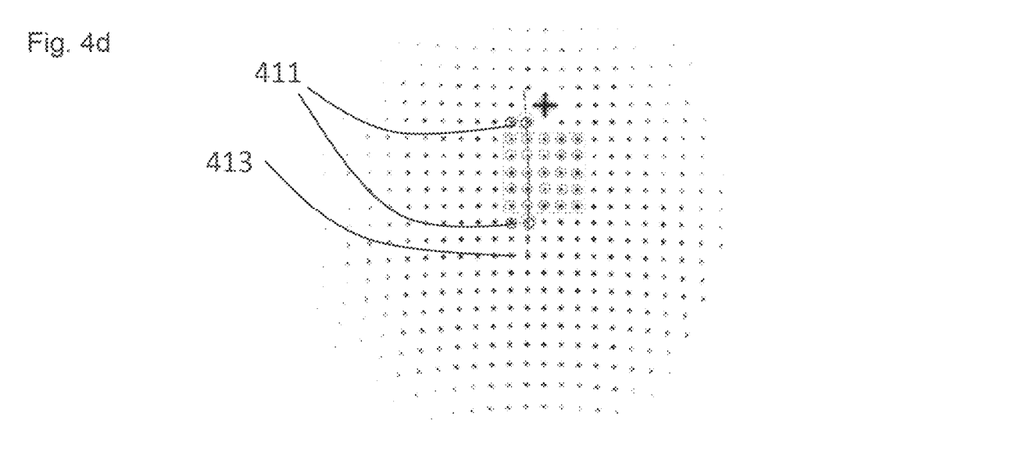
Figure 4E:
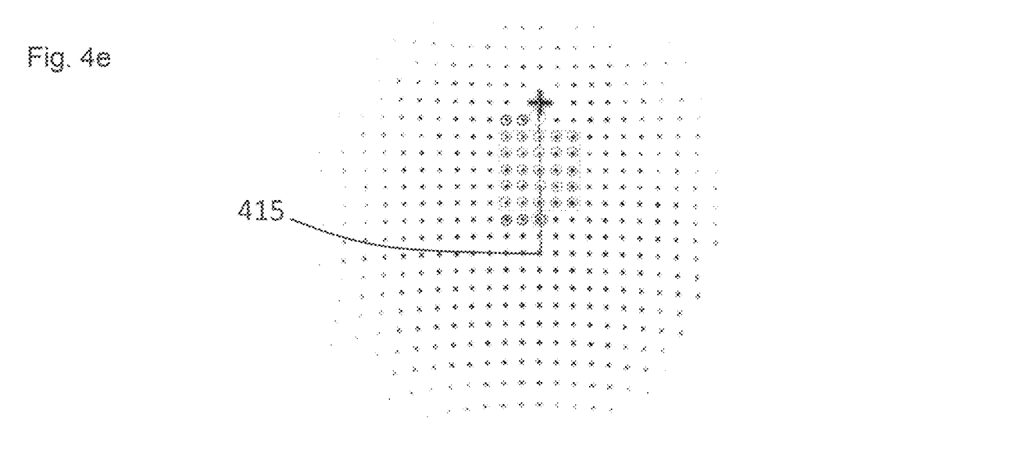
Figure 4F:
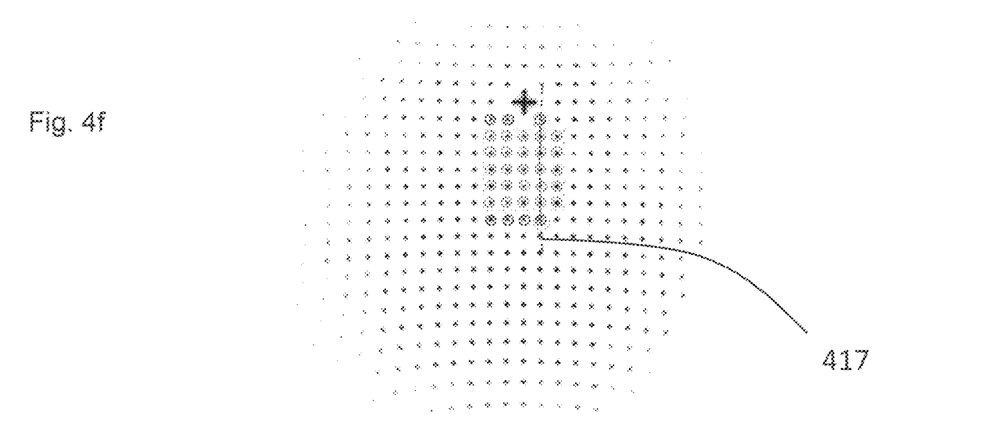
Figures 4G, 4H:
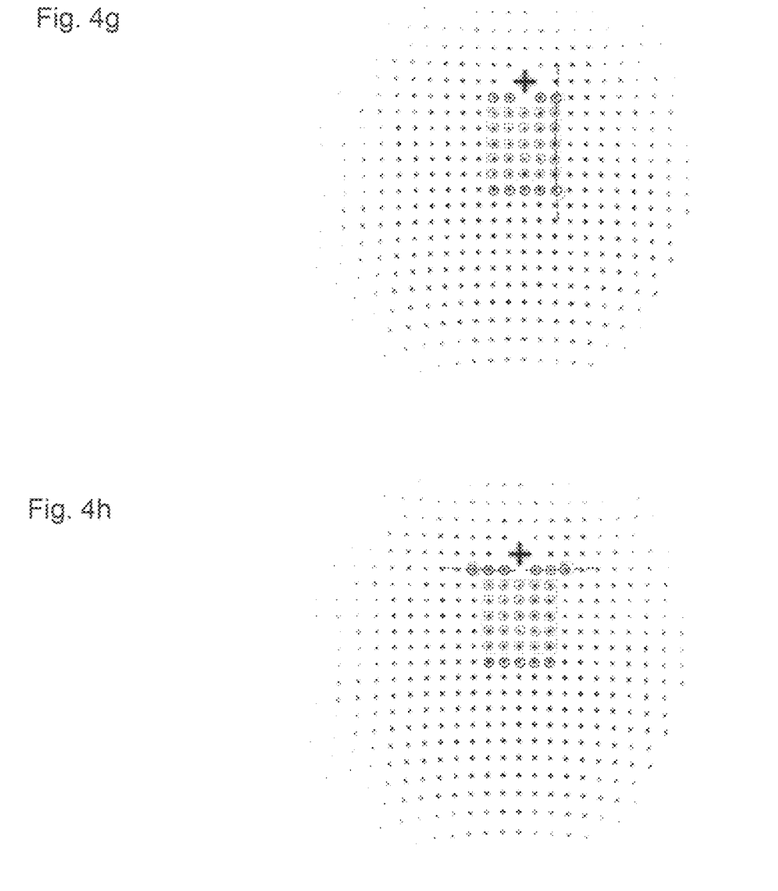
Figure 4I:
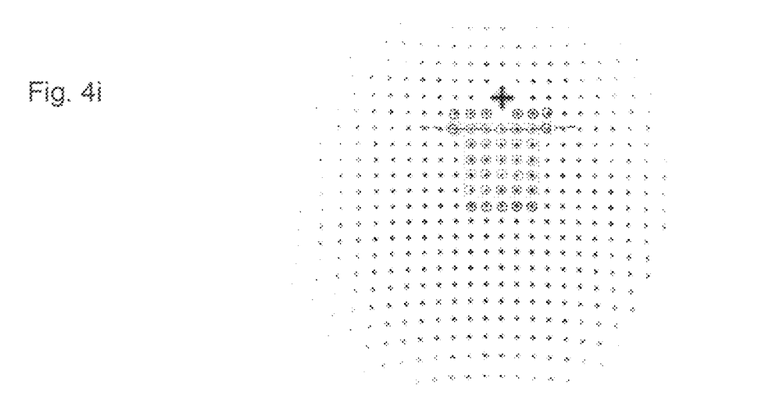
Figure 4J:
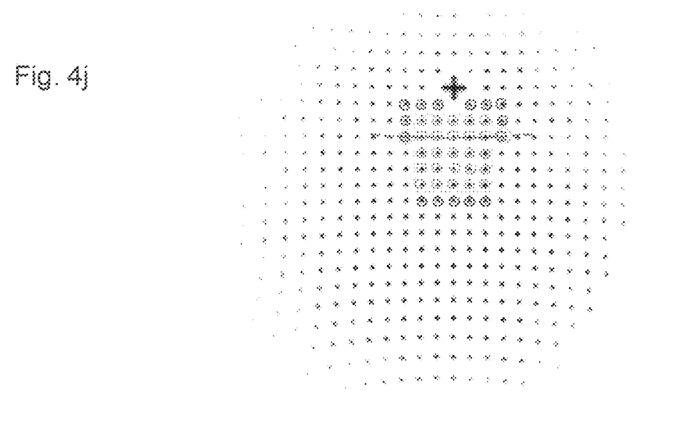
Figure 4K:
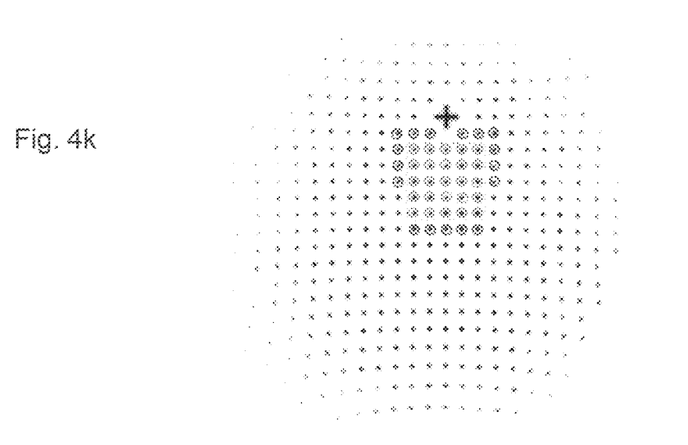
Figure 4L:
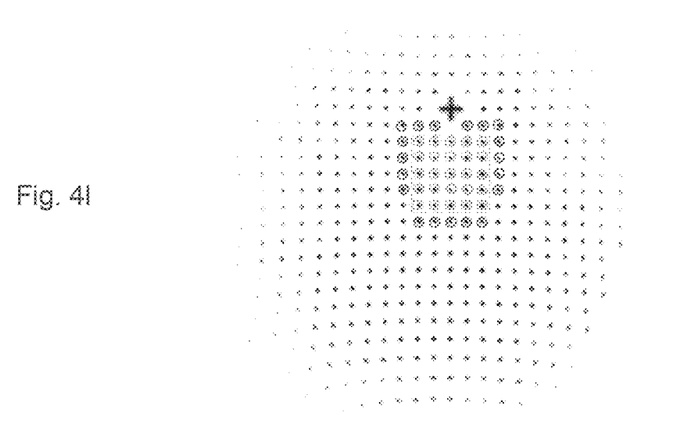
Figure 4M:
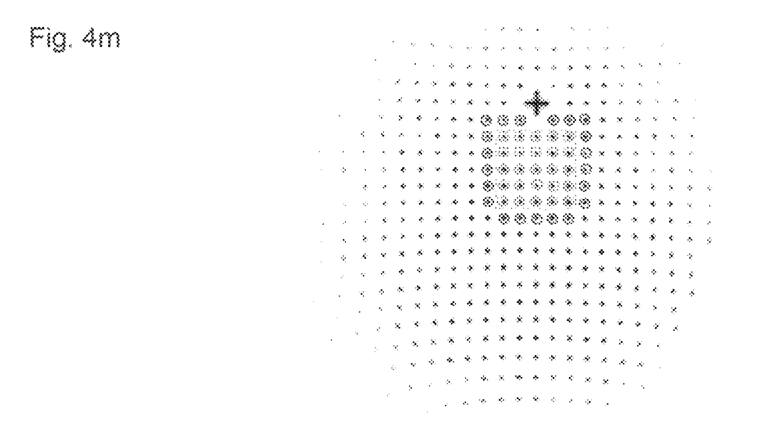
Figure 4N:
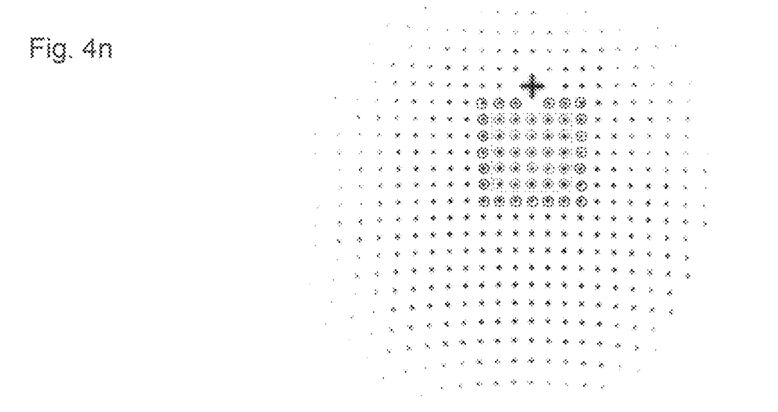
Figure 4O:
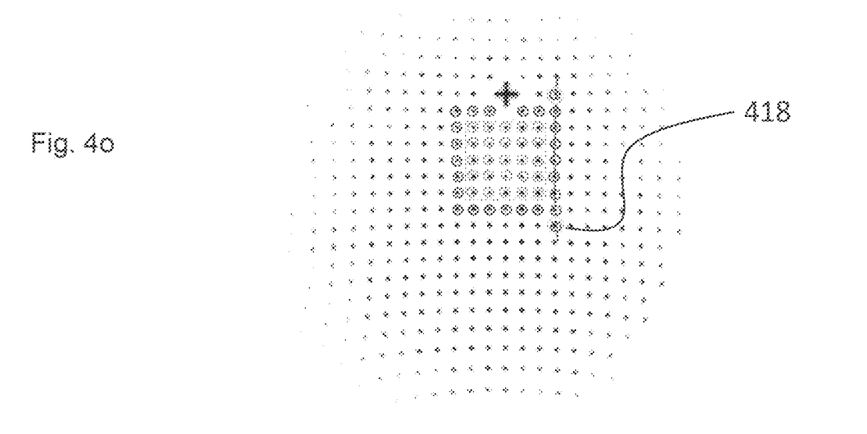

FIGS. 4a-4o provide a walkthrough of an embodiment of the dot detection iterative process on a captured image. For FIGS. 4a through 4o, the same captured image is being used for calibration. FIG. 4a shows a captured image from the optical target where the dots 404 and cross 402 are to be indexed. The calibration system assumed a rigid distribution 401 near the center point cross 402 and based on this rigid distribution the dots within are rigid area 401 are indexed based on expected center point distortion.

FIG. 4b depicts the first polynomial function 405 that is fitted to the first column of rigid points along with the subsequent points 407 along the line of the selected column or row. Based upon the fitted polynomial function 405, the approximated points 407 are indexed as non-linear indexed points 409 as seen in FIG. 4c. The process is then iterated such that the subsequent columns and rows are fitted with polynomial approximation function and predicted points are indexed. It is understood that while a polynomial approximation function is used in the embodiment of FIG. 4, alternative methods of fitting models may be used such as a learned machine learning model or non-linear function for fitting.

FIG. 4d shows the next iterative step where the next column is fitted with a polynomial approximation function 413 to predict the location of the dots at 411. FIGS. 4e and 4f similarly show the subsequent columns fitted with a polynomial approximation functions, 415, 417.

FIG. 4g shows the fifth column indexed, wherein the next iterative step is to begin fitting the polynomial approximation function to the rows as seen in FIGS. 4h and 4i. The rows continued to be iteratively fitted with the polynomial approximation function to index the subsequent points along the line of the selected row as seen in FIGS. 4j though 4m.

FIG. 4n shows where a first completed set of subsequent rows and columns have fitted with the polynomial approximation function to index the subsequent points such that in the embodiment of FIG. 4n the indexed rigid area is a 5×5 grid and the total indexed area is now 7×7. FIG. 4o shows that after the set of subsequent rows and columns are completed, the system begins to perform the dot detection and indexation on columns again 418. This is to be understood that the iterative process can be repeated on sets of columns and rows until calibration thresholds are met.

Figure 5:
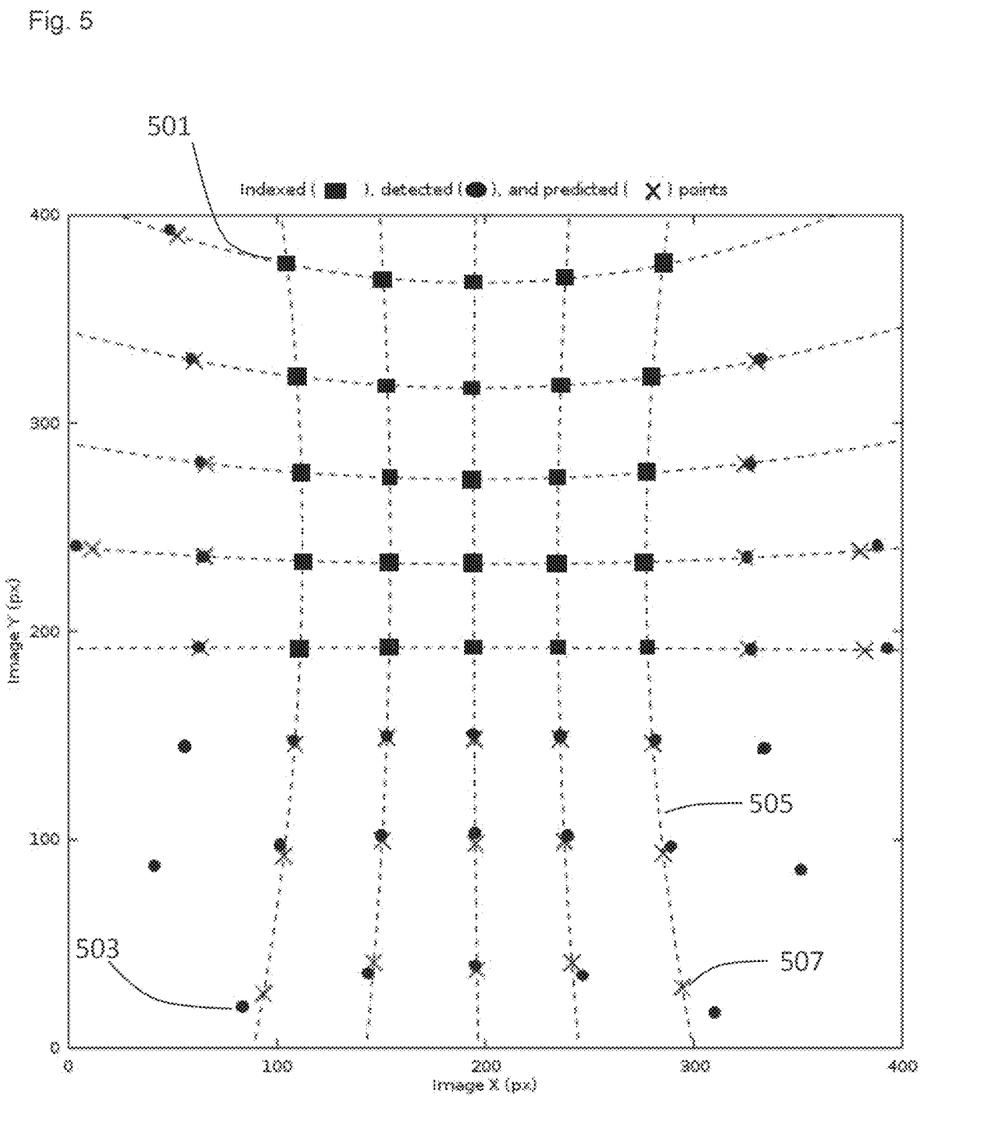
FIG. 5 shows a predicted point pattern from a known 5×5 grid.

FIG. 5 shows a predicted point pattern from a known 5×5 grid. The indexed points 501 show the points that have been indexed within the rigid area, the detected points 503 are the points that are yet to be indexed. The predicted distortion pattern is outlined with the dashed line 505, and the predicted point locations 507 for the higher-order points are show by the Xs.

The disclosure has now been described in detail for the purposes of clarity and understanding. However, it will be appreciated that certain changes and modifications may be practiced within the scope of the appended claims. The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

The invention claimed is:

1. A method for calibrating an eye tracking device within a head-mounted display (HMD) comprising the steps of:
   acquiring with the HMD via an image sensor, at least one optical target image from an optical target, wherein the optical target contains image points in a pattern;
   indexing image points within the optical target image;
   inputting indexed image points into an optimization algorithm that calculates a hardware calibration of the HMD; and
   writing hardware calibration values calculated from the optimization algorithm to the HMD unit; wherein the image points are indexed by:
   selecting a rigid region of the optical target image;
   assigning indices to image points within the rigid region;
   fitting a fitted model function to at least one column and one row of the image points of the region;

predicting the location of at least one image point using the fitted model function; and assigning the predicted image point an index.

2. The method for calibrating an eye tracking device of claim 1, wherein the fitted model function is a polynomial approximation function.

3. The method for calibrating an eye tracking device of claim 2, wherein the polynomial approximation function is fitted to a plurality of columns and rows of the image points.

4. The method for calibrating an eye tracking device of claim 2, wherein the polynomial approximation function is fitted in an iterative pattern of alternating sets of columns and rows of the image points.

5. The method for calibrating an eye tracking device of claim 2, wherein the polynomial approximation function is a second degree polynomial function or a third degree polynomial function.

6. The method for calibrating an eye tracking device of claim 2, further comprising predicting the location of at each subsequent non-indexed image point along the line of the fitted polynomial approximation function.

7. A head-mounted display (HMD) device comprising:
an eye tracking device having;
   an image sensor; and
   one or more processors configured to at least:
      acquire with the image sensor, at least one optical target image from an optical target, wherein the optical target contains image points in a pattern;
      index image points within the optical target image;
      input indexed image points into an optimization algorithm that calculates a hardware calibration of the HMD unit; and
      writing hardware calibration values calculated from the optimization algorithm to the HMD unit; wherein the image points are indexed by:
         selecting a rigid region of the optical target image;
         assigning indices to image points within the rigid region;
         fitting a fitted model function to at least one column and one row of the image points of the region;
         predicting the location of at least one image point using the fitted model function; and
         assigning the predicted image point an index.

8. The head mounted display (HMD) device of claim 7, wherein the fitted model function is a polynomial approximation function.

9. The head mounted display (HMD) device of claim 8, wherein the polynomial approximation function is fitted to a plurality of columns and rows of the image points.

10. The head mounted display (HMD) device of claim 8, wherein the polynomial approximation function is fitted in an iterative pattern of alternating sets of columns and rows of the image points.

11. The head mounted display (HMD) device of claim 8, further comprising predicting the location of at each subsequent non-indexed image point along the line of the fitted polynomial approximation function.

12. The head mounted display (HMD) device of claim 7, wherein the HMD is an augmented reality or virtual reality display device.

13. A non-transitory computer-readable storage medium storing instructions which, when executed by a head-mounted device (HMD) cause the HMD to carry out the steps of:
acquiring with the HMD, at least one optical target image from an optical target, wherein the optical target contains image points in a pattern;
indexing image points within the optical target image;
inputting indexed image points into an optimization algorithm that calculates a hardware calibration of the HMD; and
writing hardware calibration values calculated from the optimization algorithm to the HMD unit; wherein the image points are indexed by:
   selecting a rigid region of the optical target image;
   assigning indices to image points within the rigid region;
   fitting a fitted model function to at least one column and one row of the image points of the region;
   predicting the location of at least one image point using the fitted model function; and
   assigning the predicted image point an index.

14. The non-transitory computer-readable storage medium storing instructions of claim 13, wherein the fitted model function is a polynomial approximation function.

15. The non-transitory computer-readable storage medium storing instructions of claim 14, wherein the polynomial approximation function is fitted to a plurality of columns and rows of the image points.

16. The non-transitory computer-readable storage medium storing instructions of claim 14, wherein the polynomial approximation function is fitted in an iterative pattern of alternating sets of columns and rows of the image points.

17. The non-transitory computer-readable storage medium storing instructions of claim 14, further comprising predicting the location of at each subsequent non-indexed image point along the line of the fitted polynomial approximation function.

\* \* \* \* \*